United States Patent
Schulzki et al.

(10) Patent No.: US 10,564,030 B2
(45) Date of Patent: Feb. 18, 2020

(54) COVERING HOOD FOR A PLURALITY OF LOAD CELL HOUSINGS

(71) Applicant: Wipotec GmbH, Kaiserslautern (DE)

(72) Inventors: Alexander Schulzki, Stelzenberg (DE); Andreas Rübel, Olsbrücken (DE)

(73) Assignee: Wipotec GmbH, Kaiserslautern (DE)

( * ) Notice: Subject to any disclaimer, the term of this patent is extended or adjusted under 35 U.S.C. 154(b) by 224 days.

(21) Appl. No.: 15/719,462

(22) Filed: Sep. 28, 2017

(65) Prior Publication Data
US 2018/0094967 A1   Apr. 5, 2018

(30) Foreign Application Priority Data
Sep. 30, 2016 (DE) .................... 20 2016 105 471 U

(51) Int. Cl.
*G01G 21/28* (2006.01)
*G01G 21/20* (2006.01)
*G01G 21/30* (2006.01)

(52) U.S. Cl.
CPC ............. *G01G 21/28* (2013.01); *G01G 21/30* (2013.01)

(58) Field of Classification Search
CPC ................................ G01G 21/28; G01G 21/30
See application file for complete search history.

(56) References Cited

U.S. PATENT DOCUMENTS

| | | | |
|---|---|---|---|
| 4,858,711 A | 8/1989 | Kunz | |
| 2009/0308665 A1* | 12/2009 | Schilling | G01G 21/00 177/210 EM |
| 2011/0017521 A1* | 1/2011 | Birrer | G01G 21/23 177/232 |
| 2014/0353050 A1* | 12/2014 | Schulzki | G01G 21/30 177/239 |

FOREIGN PATENT DOCUMENTS

| | | |
|---|---|---|
| DE | 20 2008 014660 U1 | 1/2009 |
| JP | 2008129014 A | 6/2008 |
| JP | 2011149730 A | 8/2011 |
| JP | 2017009386 A | 1/2017 |

OTHER PUBLICATIONS

European Patent Office Search Report in EP 17 19 4000, dated Feb. 8, 2018.
Japan Patent Office Action in JP2017192861A, dated Aug. 16, 2018.

* cited by examiner

*Primary Examiner* — Randy W Gibson
(74) *Attorney, Agent, or Firm* — The Culbertson Group, P.C.

(57) ABSTRACT

A covering hood for jointly covering a plurality of a load cell housings in which a load introduction pin protrudes from each load cell housing through a housing opening. The covering hood including a separate passage opening in an upper part of the covering hood for each load introduction pin. The covering hood can be connected to the individual load cell housings at each separate passage opening.

12 Claims, 2 Drawing Sheets

COVERING HOOD FOR A PLURALITY OF LOAD CELL HOUSINGS

TECHNICAL FIELD OF THE INVENTION

The present invention relates to a covering hood for jointly covering a plurality of load cells.

BACKGROUND OF THE INVENTION

In industrial weighing technology, plural load cells are frequently arranged one next to another in order to achieve higher throughput by means of distributed product flows or to be able to compactly solve various weighing problems. So-called multitrack weighing systems, in which products to be weighed such as tablets are distributed onto several tracks, wherein at least one load cell is arranged in each track, are a typical case.

The arrangement of load cells or the load cell housings thereof closely adjacent to one another reduces the installation space required for the system, but cleaning the individual load cell housings is difficult. Precisely in the production of pharmaceutical products or foods there are particularly high requirements for cleanliness in the production facilities, so that the housings of the load cells also have to be cleaned regularly and thoroughly. If load cell housings are arranged tightly together, small gaps between the housings arise, which are difficult to clean. For good cleaning, the housings would have to be removed, which would result in the temporary shutdown of individual tracks or the entire weighing system and would endanger the desired high product throughput.

SUMMARY OF THE INVENTION

It is an object of the invention to address the above-mentioned problem, and provide an arrangement that considerably reduces the cleaning effort for weighing systems having multiple, closely spaced load cells, such as multitrack weighing systems for example.

The invention is based on the idea of avoiding the deposition of contaminants between adjacent load cell housings with the aid of a covering hood jointly protecting the load cell housings. According to the invention, at least two load cell housings are jointly covered by the covering hood in such a way that the narrow interstices between the load cell housings are protected or covered against contamination. The cover preferably covers all the load cell housings jointly and protects the entire load cell arrangement from contamination.

A load cell of a multitrack weighing system generally comprises a load cell housing having a housing opening at the upper side of the housing, through which a load introduction pin protrudes vertically upward. During operation of the load cell, the load introduction pin absorbs a weight force to be detected and conducts it through the housing opening into the interior of the load cell housing, where the detected force is converted via suitable sensor means (electromagnetic force compensation with monobloc technology, strain gages, vibrating strings, etc.) into a weight signal to be further processed. The housing opening for passing the load introduction pin is preferably tightly fitted to the load introduction pin in order to avoid penetration of contaminants or electromagnetic radiation into the interior of the load cell housing.

The covering hood according to the invention comprises an upper part, which jointly covers some or all load cell housings of the multitrack weighing system from above. The upper part contains a separate passage opening for each load introduction pin of the load cell housing to be covered. In this way, the covering hood can be placed or slipped from above onto the existing arrangement of load cell housings positioned side-by-side in such a manner that subsequently only the load introduction pins of the individual load cells penetrating through the individual passage openings are visible or accessible. The remainder of the load cell arrangement, particularly the gaps or interstices existing between the individual load cell housings, remains advantageously protected against falling product residues or contaminants underneath the upper part or inside the covering hood.

The covering hood can expediently be connected to the individual load cell housings, wherein the upper part preferably rests in a sealing manner against a portion of the upper side of the individual load cell housing. This yields a number of advantages. Firstly, the sealing contact between the lower side of the upper part of the covering hood and the upper side of the individual load cell housing ensures that any contaminants penetrating into the respective passage opening cannot reach the space between the covering hood and the outer side of the load cell housing. Secondly, the vertical distances between the housing openings of the individual load cell housings and the associated passage openings in the upper part of the covering hood are reduced to a minimum.

The covering hood according to the invention allows the arrangement of at least two load cell housings, which are jointly covered by the covering hood. The cover according to the invention can advantageously also cover load cell housings that are not positioned directly or closely adjacent to one another, in which case the intermediate space between the load cell housings is also covered and protected against contamination.

A particularly advantageous embodiment of the invention relates to an arrangement of a plurality of load cell housings, which are not only jointly covered by the covering hood but are each connected thereto. This is accomplished with the aid of a sleeve for each load cell housing, which extends both through the respective housing opening of the load cell housing and the associated passage opening of the upper part. Fastening means engaging with the sleeve fix the upper part of the cover and the respective load cell housing to one another.

In particular, a labyrinth seal ring known per se can be used as the fastening means, which is additionally intended to hinder the penetration of contaminants into the passage opening, and especially into the housing opening of the respective load cell. The labyrinth seal ring can preferably be screwed onto an external thread of the sleeve. Alternatively, it can also be formed integrally with the sleeve.

The arrangement according to the invention can be assembled by first fastening the respective sleeve to some or all load cell housings or in the housing opening of the respective load cell, for example by being screwed into an internal thread provided there. A flange positioned on the sleeve can be used to define the screw-in depth and simultaneously to produce a positive stop between the sleeve and the load cell housing. At the same time, the sleeve can be secured in or on the load cell housing against unintended loosening. This can be done, for example, by gluing or by a securing means (screw, locking pin, self-locking nut, etc.) acting in a friction-fitted or positive manner on the sleeve and simultaneously engaging with the load cell housing.

After installation of the sleeve on (preferably) all load cell housings, the covering hood according to the invention can be placed onto the load cell housing in such a manner that the respective sleeves protrude through the associated passage openings of the upper part. The load introduction pins protruding upward within the individual sleeves are then accessible from the outside of the covering hood, while the group of load cell housings is otherwise completely covered by the covering hood. To fasten the covering hood, fastening means preferably formed as labyrinth seal rings are subsequently fastened to the portion of the respective sleeve protruding through the cover, preferably by being screwed on. The diameter of the respective passage opening is (preferably slightly) larger than the outside diameter of the respective sleeve and at the same time smaller than the effective outside diameter of the labyrinth seal ring, so that the labyrinth seal ring acts with the lower side thereof against the upper side of the upper part. If the upper part lies against a portion of the load cell housing, then it can be tightened in a positive manner against the load cell housing.

A special advantage of the covering according to the invention is that it is designed to be compatible with multitrack weighing systems in which the individual load cell housings themselves are already equipped with a sleeve of the aforementioned type. In ordinary operation of a load cell not covered according to the invention, the sleeve is used merely to secure the labyrinth seal, which is intended to prevent the penetration of contaminants into the interior of the load cell housing, to the upper side of the load cell housing. The covering hood according to the invention can be installed by a simple method or retrofitted on site, however, with only slight expense as joint protection for a group of such load cell housings. This can be done particularly advantageously by the customer or operator of the multitrack system, without having to remove the load cells from their installation locations or impermissibly open them. The position and precision of load cells that may have been previously calibrated, the integrity of their housings and existing EMC protection are preserved unchanged during and after the installation of the covering hood.

Merely the labyrinth seal rings of the individual load cell housings are temporarily removed (unscrewed) in order to place the covering hood with suitable passage openings onto the load cell arrangement, whereafter the individual labyrinth seal rings are again to be screwed onto the sleeves protruding through the passage openings. The load cells or load cell housings, particularly also gaps and interstices existing between them, are then well protected against contamination.

The covering hood according to the invention is preferably designed such that a number of passage openings can be closed by blind caps in cases where not every passage opening is needed. Alternatively or additionally, the covering hood can also be designed for inserting passage openings into the upper part on site, depending on the spatial position of the load introduction pins, for example by removing circular or other material portions from the upper part by means of designed breaking points. In this way the covering hood can be used flexibly for various arrangements of load cell housings, whether closely adjacent to one another or with a larger intermediate spacing.

An arrangement of load cell housings and a covering hood preferably has additional sealing means, which preferably act between the labyrinth seal ring and the upper part of the covering hood. Thus an O-ring could be inserted into an annular groove on the underside of the labyrinth seal ring, which additionally seals after being screwed on the sleeve or with contact with the upper side of the upper part.

The covering hood can also completely cover the arrangement of load cell housings laterally in order to prevent ingress of contaminants from the side as well. To accomplish this, the side walls of the covering hood preferably extend downwards as far as a baseplate on which the load cells are arranged. Alternatively, the lateral protection can also end above such a baseplate.

There is preferably a specifiable distance between the inner side of the covering hood and one or more outer sides of the load cell housings in order to form an air gap. This improves the thermal insulation of the load cells arranged inside the covering hood with respect to the environment.

These and other advantages and features of the invention will be apparent from the following description of representative embodiments, considered along with the accompanying drawings.

DESCRIPTION OF REPRESENTATIVE EMBODIMENTS

Figure 2:
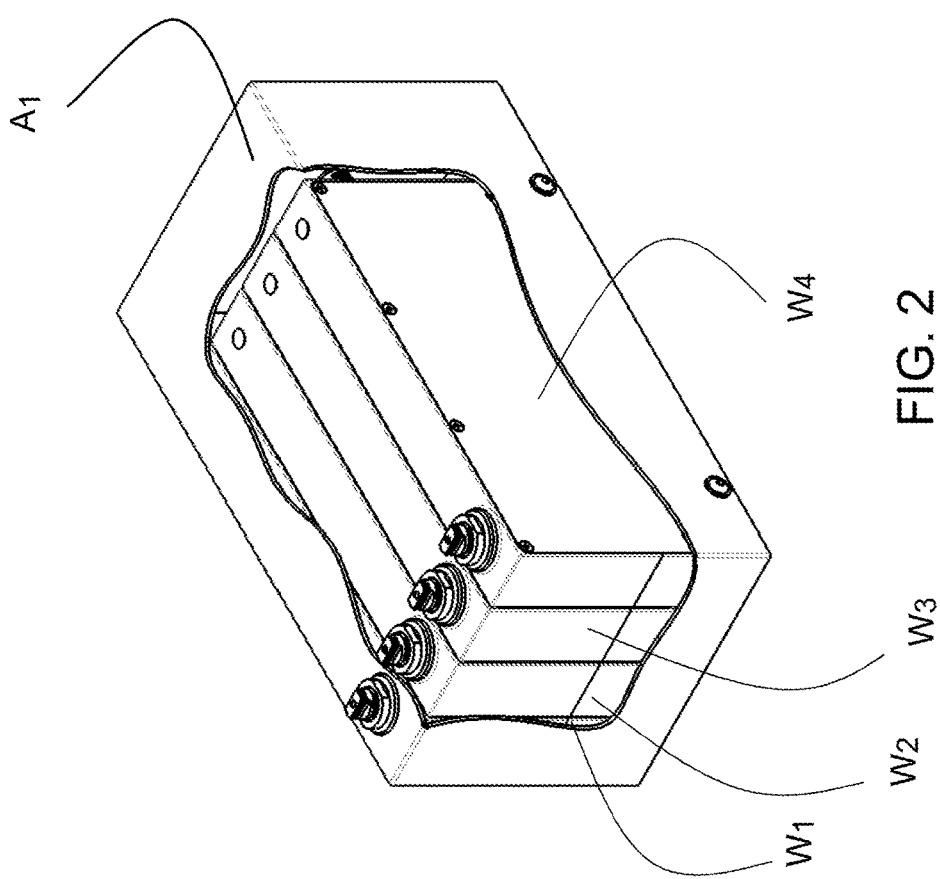
FIG. 2 shows an example of a covering hood arrangement according to aspects of the invention.

As is clear from the overview in FIG. 2, an arrangement of a plurality of load cell housings $W_1$, $W_2$, $W_3$, and $W_4$ one next to another is covered by a common covering hood $A_1$ in an operating condition. Similarly, in FIG. 3 an arrangement of load cell housings $W_5$, $W_6$, $W_7$, and $W_8$ is covered by a common covering hood $A_2$ (the covering hood $A_2$ being broken away at several areas so as to show the load cell housings $W_5$, $W_6$, $W_7$, and $W_8$). In the case of both FIG. 2 and FIG. 3, the gaps or interstices between the individual load cell housings ($W_{1-5}$ in FIG. 2 and $W_{5-8}$ in FIG. 3) are completely covered with respect to the environment by the joint covering hood, $A_1$ and $A_2$, respectively, when the covering hood is in the operating condition.

Figure 3:
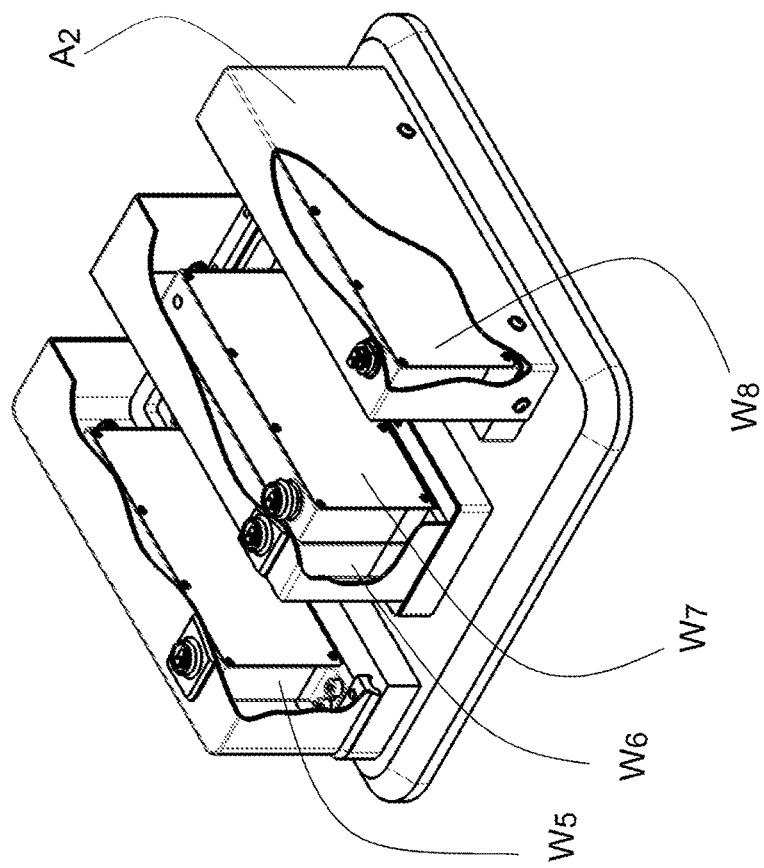
FIG. 3 shows another example of a covering hood arrangement according to aspects of the invention.

Whereas the individual load cell housings $W_1$, $W_2$, $W_3$, and $W_4$ in FIG. 2 are arranged immediately next to one another and form only narrow gaps between one another, the load cell housings $W_5$, $W_6$, $W_7$, and $W_8$ illustrated in FIG. 3 are positioned with a larger space between one another. Nevertheless, the covering hood $A_2$ covers all the load cell housings $W_5$, $W_6$, $W_7$, and $W_8$ jointly and thus protects the gaps and the larger intermediate spaces equally from ingress of contaminants.

Figure 1:
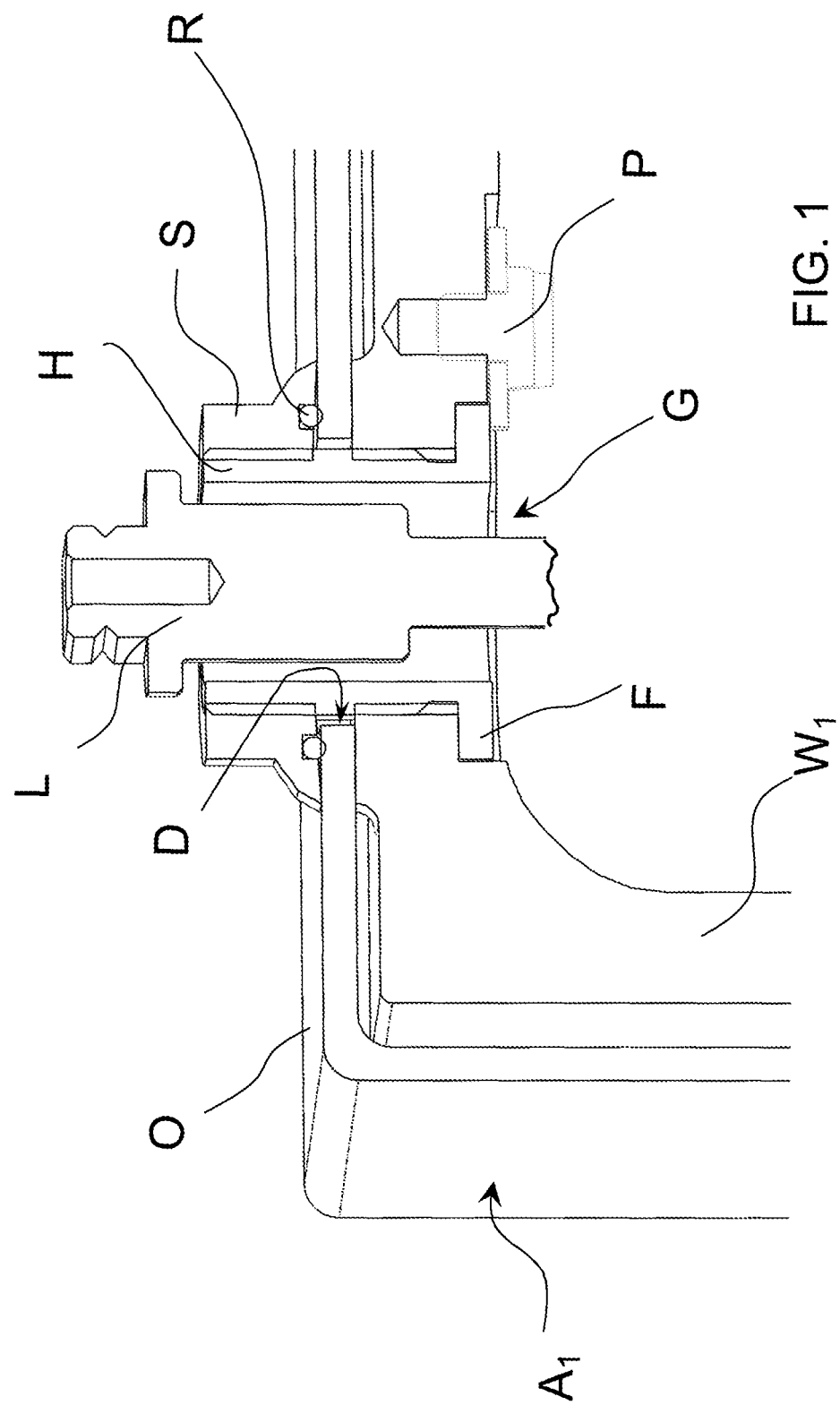
FIG. 1 shows an enlarged sectional representation of the arrangement in the area of the load introduction pin.

FIG. 1 shows a somewhat schematic detail section view of a portion of covering hood $A_1$ and load cell housing $W_1$ of FIG. 2, and particularly the region of the arrangement where a load introduction pin associated with load cell housing $W_1$ protrudes through covering hood $A_1$. It will be appreciated that a similar arrangement to that shown in FIG. 1 is included for each of the other load cell housings shown in FIGS. 2 and 3. As shown in FIG. 1, load cell housing $W_1$ has a housing opening G through which a load introduction pin L protrudes up to the outer side of the housing $W_1$. The housing opening G has an internal thread, not specifically labeled, into which a sleeve H provided with a matching external thread is screwed from below. A flange F arranged at the rear (lower) end of the sleeve H cooperates with a complementary stop surface of the load cell housing $W_1$ when the final screw-in position of the sleeve H has been reached.

Covering hood $A_1$, which has a passage opening D in an upper part O, is placed over the load cell housing $W_1$ and the sleeve H or the load introduction pin L protruding upward out of the housing. The passage opening D is selected to be larger than the outer diameter of the sleeve H. The lower side of the upper part O rests flatly against an upper surface, not specifically labeled, of the load cell housing $W_1$ and thereby seals the narrow space between the outer side of the load cell housing $W_1$ and the inner side of the covering hood A.

A labyrinth seal ring S shown in a simplified representation is screwed from above onto the upward-protruding end of the sleeve H until it contacts the upper side of the upper part O. Since the sleeve H, along with the flange F thereof, lies against the inner side of the load cell housing $W_1$, the labyrinth seal ring S, when screwed onto the external thread of the sleeve H, is able to generate a pressing force between the lower side of the labyrinth seal ring S and the upper side of the upper part O, which simultaneously presses the upper part O onto the upper side of the load cell housing W.

To achieve an improved sealing effect, a circumferential groove, in which an O-ring R is arranged, is cut into the lower side of the labyrinth seal ring S in order to additionally seal the gap between the labyrinth seal ring S and the upper part O.

A securing screw P inserted into the inner side of the load cell housing $W_1$ applies pressure with a flange-like broadened portion to the lower side of the flange F of the seal H. This ensures that the sleeve H is not inadvertently detached from the housing opening G or rotated relative to the housing.

As used herein, whether in the above description or the following claims, the terms "comprising," "including," "carrying," "having," "containing," "involving," and the like are to be understood to be open-ended, that is, to mean including but not limited to.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above described representative embodiments are intended to illustrate the principles of the invention, but not to limit the scope of the invention. Various other embodiments and modifications to these representative embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

LIST OF REFERENCE CHARACTERS

A Covering hood
D Passage opening
F Flange
G Housing opening
H Sleeve
L Load introduction pin
O Upper part
P Securing screw
R Seal
S Labyrinth seal ring
W Load cell housing

The invention claimed is:

1. A covering hood for covering a plurality of load cell housings, each respective load cell housing having a respective housing opening with a respective load introduction pin protruding there through, the covering hood including:
(a) a covering hood upper part having a separate passage opening formed therein for each load introduction pin;
(b) a respective fastening means for each separate passage opening formed in the covering hood upper part; and
(c) wherein the covering hood upper part and each respective fastening means are configured so that when the covering hood upper part and each respective fastening means are in an operating condition with respect to the plurality of load cell housings, each respective load introduction pin protrudes through a different one of the separate passage openings of the covering hood upper part and at each separate passage opening a respective fastening means fastens the covering hood upper part to a respective one of the load cell housings.

2. The covering hood of claim 1 wherein when the covering hood upper part and each respective fastening means are in the operating condition the covering hood upper part resides in sealing position against an upper side of the respective load cell housing around the periphery of each separate passage opening.

3. The covering hood of claim 1 wherein each fastening means includes an internal threaded connector adapted to cooperate with an external threaded element associated with a respective load cell housing.

4. The covering hood of claim 3 wherein each fastening means includes a labyrinth seal ring with an O-ring mounted at a lower surface of the labyrinth seal ring in position to face the covering hood upper part when the covering hood upper part and each fastening means are in the operating condition.

5. An apparatus including:
(a) a plurality of load cell housings, each respective load cell housing having a respective housing opening with a respective load introduction pin protruding there through;
(b) a covering hood having a covering hood upper part with a separate passage opening formed therein for each load introduction pin, the covering hood residing in an operating condition with respect to the plurality of load cell housings in which each respective load introduction pin protrudes through a different one of the separate passage openings of the covering hood upper part; and
(c) a respective fastening means for each separate passage opening formed in the covering hood upper part, each respective fastening means fastening the covering hood to a respective one of the load cell housings at a different one of the separate passage openings.

6. The apparatus of claim 5 wherein each respective housing opening and corresponding separate passage opening includes a respective sleeve protruding there through and through a respective one of the separate passage openings, and wherein each respective fastening means engages with a respective one of the sleeves to fasten the covering hood to a respective one of the load cell housings.

7. The apparatus of claim 6 wherein each fastening means is a labyrinth seal ring having an internal thread adapted to be screwed onto an external thread of a respective one of the sleeves to engage an upper side of the covering hood upper part.

8. The apparatus of claim 6 wherein each fastening means is a labyrinth seal ring formed integrally with a respective one of the sleeves.

9. The apparatus of claim 6 wherein each sleeve includes an external threaded portion and each housing opening includes an internal thread adapted to threadingly receive a respective one of the sleeves.

10. The apparatus of claim 6 further including securing means associated with each respective sleeve for secured the respective sleeve against unintended detachment from the respective load cell housing.

11. The apparatus of claim 6 wherein each respective sleeve has an integrally formed or attached flange that cooperates with a respective one of the load cell housings to specify the position of the sleeve relative to the respective load cell housing.

12. The apparatus of claim 5 wherein each fastening means includes a labyrinth seal ring with an O-ring mounted at a lower surface of the labyrinth seal ring facing the upper part of the covering hood.

\* \* \* \* \*